United States Patent [19]

Carmona et al.

[11] Patent Number: 4,848,002
[45] Date of Patent: Jul. 18, 1989

[54] SELF-CENTERING NEEDLE-LESS MAGNETIC COMPASS

[76] Inventors: Angel G. Carmona; Gregorio Martinez-Gomez, both of 24-47 24 St., Astoria, N.Y. 11102

[21] Appl. No.: 184,444

[22] Filed: Apr. 21, 1988

[51] Int. Cl.⁴ ............................................. G01C 17/08
[52] U.S. Cl. ...................................................... 33/364
[58] Field of Search .................... 33/364, 365, 355 R, 33/358, 359

[56] References Cited

U.S. PATENT DOCUMENTS

| | | | |
|---|---|---|---|
| 1,754,055 | 4/1930 | Senter | 33/364 |
| 2,041,072 | 5/1936 | Kollsman | 33/364 |
| 2,506,353 | 5/1950 | Finneran, Jr. et al. | 33/364 |
| 3,068,583 | 12/1960 | Goshen | 33/364 |
| 3,286,358 | 11/1966 | Smokowski | 33/364 |
| 3,334,420 | 8/1967 | Stockton | 33/364 |
| 3,373,498 | 3/1968 | Chabbert | 33/364 |
| 4,156,178 | 5/1979 | Stockton | 33/364 |

Primary Examiner—William A. Cuchlinski, Jr.
Assistant Examiner—Chris Fulton
Attorney, Agent, or Firm—Nicholas J. Garofalo

[57] ABSTRACT

A magnetic compass having a magnet bearing float in a liquid and which float is self-centering and rotatable relative to an element of soft magnetic material spaced below it so as to align a pointer on the float with the earth's north magnetic pole and with the north point of a compass readout dial.

7 Claims, 1 Drawing Sheet

SELF-CENTERING NEEDLE-LESS MAGNETIC COMPASS

BACKGROUND OF THE INVENTION

This invention relates to new and useful improvements in magnetic instruments for determining direction. More particularly, it is concerned with the provision of a magnetic compass having a magnet bearing float which is self-centering and rotatable relative to an element of soft magnetic material spaced below it so as to align a pointer on the float with the earth's north magnetic pole and with the north point of a compass readout dial.

The conventional compass is an instrument for determining direction by allowing a bar magnet, commonly called a needle, balanced on a pin to pivot freely to align itself in the direction of the earth's magnetic field with the north-seeking pole of the magnet pointing toward the north magnetic pole of the earth.

A particular problem associated with the conventional needle compass is one of wear developing in the needle relative to the pivot. A jewel centered in the needle and resting upon a pivot tipped with a very hard material, such as iridium, is employed as a means tending to reduce this wear. Some compasses, such as the mariner's compass, which is also a needle compass, is subject to rolling with the ship in rough waters. A gimbal support allowing multiple axes of movement for the compass is provided with the mariner's compass for stabilizing it. Other faults commonly associated with the conventional needle compass arise from its complexity and the number of components it requires to employ the pivoted needle.

Accordingly, a general object of this invention is to provide a magnetic compass which does not have the faults commonly associated with the conventional needle compass.

A further object of the present invention is to provide a magnetic compass which functions efficiently without the need of a pivoted needle, a pivot pin or a gimbal. It accordingly does not have the problems of wear, or the need of the multiple components associated with the needle type compass.

A more particular object of this invention is to provide a self-centering needle-less compass, one which uses a magnetic float instead of a needle and employs a magnetic sphere for continually centering the float so that a pointer on the float pivots about an imaginary axis in becoming magnetically aligned with the earth's north-magnetic pole.

A noteworthy advantage of a compass embodying the present invention lies in the simplicity of its structure in that there is no complexity in the arrangement or association of its components, and in that the number of its components is relatively small as compared with the conventional needle compass.

A further advantage of a compass embodying the present invention is that it may be used alone, or it may be incorporated as a component of a surveyor's transit, an astronomer's sextant or a mariner's compass as well as other instruments.

BRIEF SUMMARY OF THE INVENTION

The compass of the present invention includes a container partially filled with a liquid upon which floats a body containing a magnet. The body floats relative to a soft iron ball spaced below it. The ball is self-centering relative to the bottom of a concaved bottom of the container upon which it rolls; and the magnetic forces of the magnet in their action relative to the ball maintain the float centered at all times above the ball and pivotable about an imaginary common axis passing through the magnet and the ball. The float has fixed upon its surface a pointer which, due to the magnet within the float and the ball spaced below the float, continuously aligns itself with and points to the north magnetic pole of the earth. A suitable readout dial as to the points of the compass is arranged above the float for indicating direction in conjunction with the pointer.

The particular structure of the invention, its features and advantages wil become increasingly apparent as this specification unfolds in greater detail and as it is read in conjunction with the accompanying drawing. However, it is to be expressly understood that the drawing is for purposes of illustration and description, and it is not to be construed as limiting the scope of the invention.

BRIEF DESCRIPTION OF THE DRAWING

In the accompanying drawing.

DETAILED DESCRIPTION OF THE INVENTION

Figure 1:
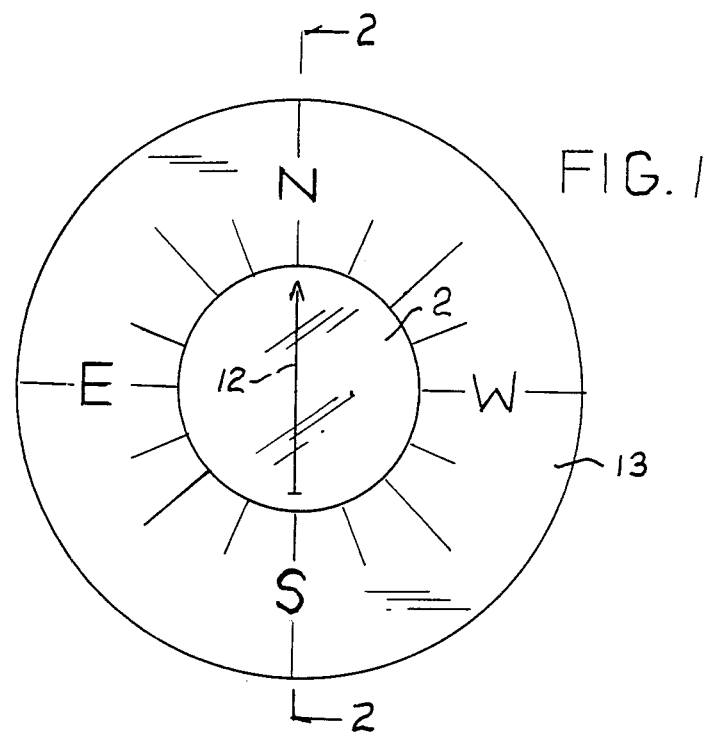
FIG. 1 is a top plan view of a compass instrument embodying the invention.
Figure 2:
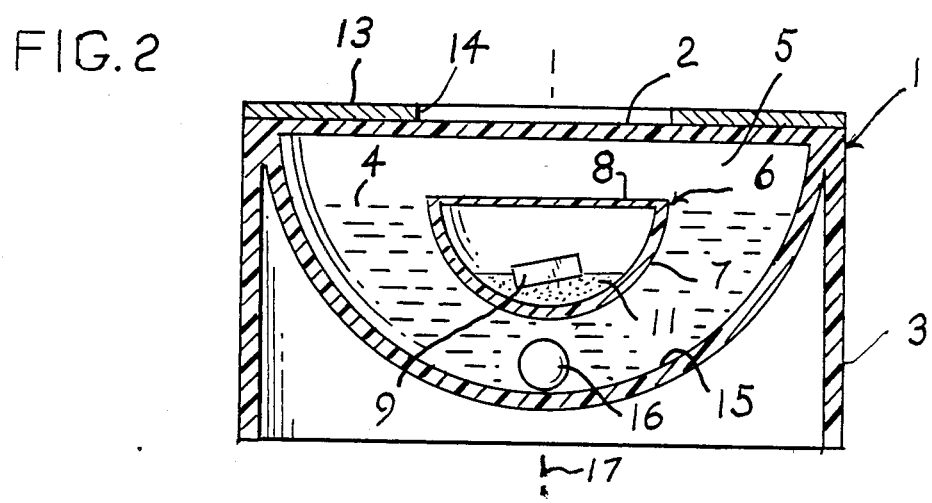
FIG. 2 is a section on line 2—2 of FIG. 1.
Figure 3:
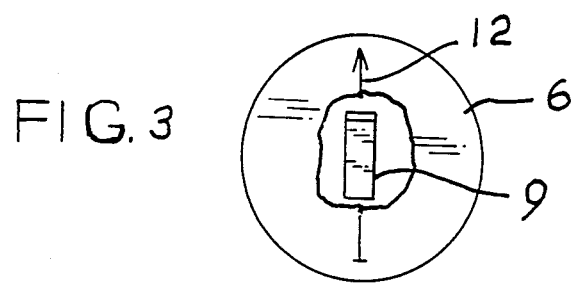
FIG. 3 is a top plan view of the float element.

A compass instrument embodying the invention is illustrated in the accompanying drawing. The body of the instrument includes a container 1, the top of which is closed and sealed by a horizontally disposed cap 2 having a flat upper surface. Integral with the container is a depending wall or skirt 3 which serves as a means for resting the instrument upon a table surface. The container, including its cap and depending wall is formed of a non-magnetic material, such as plastic, and the cap is of a transparent plastic.

The container is partially filled with a liquid 4 of a kind which is not readily subject to freezing, such as alcohol. It is intended that a space 5 remain between the surface of the liquid and the cap.

Floating in the liquid is a body or float 6. Here, the float is in the form of a hemispherical shell 7 closed and sealed by a horizontal flat top wall 8. The float is of non-magnetic material, such as plastic. Seated within the shell is a permanent magnet 9, here a bar form magnet. It is centered relative to the vertical axis of the shell; and it dips at a slight angle, preferably at about 30° from horizontal. The magnet is fixed in this position in a cement 11 which is adhered to the inner bottom surface of the shell. Accordingly, the magnet and float are a unit. The overall weight of the unit is such as to cause it to depend in the liquid to a degree where its top wall 8 protrudes to a small extent above the liquid. The space 5 is provided above the liquid so as to allow the float during any mild disturbance of the container to freely tilt or rock with the liquid without bumping into the top wall of the container.

The north seeking pole of the magnet will at all times cause the float and magnet to turn as a unit, as when the magnet acts to align itself with the earth's magnetic field or north magnetic pole. In this respect, if the container is held still, the pull of the earth's north magnetic pole will tug the north seeking end of the magnet, commonly called the north pole of the magnet, so that it will point north. A pointer 12, marked upon the top surface of the float in parallel relation to the magnet and aligned with the north pole of the magnet, will accordingly also point to the north.

A dial or compass readout card 13 is provided upon the surface of the top wall of the container. It is concentric with the vertical axis of the container. It is marked with the cardinal points N. E. S. W. and lesser points of the compass. It is provided with a central opening 14, whereby the pointer 12 on the float is visible to the observer through the transparent top wall or cap 2 of the container. The compass markings on the readout card may, if desired, be applied directly to the top wall 2 of the container.

So as to maintain the float centered relative to the readout card and the central opening in the card, the surface 15 of the internal bottom wall of the container is concave and a non-permament magnetic ball, here a soft iron ball 16 is freely rollable over the concave surface below and in spaced relation to the float. To this end, the container is preferably hemispherical.

The ball has a normal position in which it is centered upon the concave surface at the bottom of the container and in spaced relation to the float. In this normal position a common vertical axis 17 passes through the concave surface, the ball, the float including the magnet and pointer, and the center of the opening in the readout card. And, at all times a common axis passes through both the ball and the magnet, not only when the container is at rest but also when it is tilted or when the float is rocking due to mild movements of the liquid in which it floats. This common axis remains vertical at all times.

The float, magnet and ball obtain this axially aligned condition due to the forces of the magnet acting upon the soft iron ball. The pull or strength of the magnet is such as to maintain the magnet and its supporting float centered relative to the ball at all times, but it is not strong enough to overcome the weight of the ball. Accordingly, the magnet will not draw the ball into holding contact with the float; nor will the magnet keep the ball in holding contact with the float should the ball come into contact with it. Accordingly, a desired resulting separation or spacing is maintained between the ball and the float without affecting the axially aligned condition of the float, magnet and the ball.

It is about this common axis that the float and magnet as a unit revolves relative to the ball accordingly as the magnet turns in seeking the north magnetic pole. This imaginary axis in effect replaces the physical pivot pin of the conventional compass, and allows for a desirable spacing of the float from the surrounding wall of the container.

Figure 4:
FIG. 4 is a magnetic ball of a modified structure.

In some applications of the invention it may be desired to increase the weight of the ball without increasing its magnetic content. This may be done by providing the soft iron ball with a covering 18 of non-magnetic metal, such as bronze or copper, as indicated in FIG. 4.

From the foregoing it should now be apparent that the invention provides a needle-less compass without a pivot pin. It provides a compass in which a magnet containing pointer unit floats upon a liquid and in seeking the north magnetic pole it pivots about an imaginary axis passing through the unit and a soft iron ball spaced below the unit.

As an illustration of the use of the invention, let it be assumed that an instrument embodying the invention is fixed upon an horizontal panel of a vehicle and that the vehicle is moving in a north direction. In this situation, the pointer 12 and the N marking on the dial card 13 will be aligned with the earth's north magnetic pole. Now, should the vehicle progressively turn easterly, the float will continue to hold the pointer in the direction of the earth's north magnetic pole, but the dial card will be progressively carried clockwise by the vehicle relative to the pointer, and a reading of the direction in which the vehicle is moving will be indicated by the marking on the dial card that is brought into register with the pointer. Similarly, should the vehicle progressively turn westerly, the dial card will be carried with it counterclockwise relative to the pointer to indicate the direction of travel. In effect, the dial card will pivot about the axis of the instrument relative to the float and the pointer accordingly as the subject holding the instrument moves.

While an embodiment of the invention has been illustrated and described in detail, it is to be expressly understood that the invention is not limited thereto. Various changes of form, design or arrangement may be made in its components without departing from the spirit and scope of the invention as the same will now be understood by those skilled in the art; and it is our intent, therefore, to claim the invention not only as shown and described, but also in all such forms and modifications thereof as may be reasonably construed to fall within the spirit of the invention and the scope of the appended claims.

What is claimed is:

1. A container of non-magnetic material having an inner concave bottom surface, a ball of non-permanent magnetic material disposed upon and freely rollable over the concave surface, a liquid partially filling the container, a body having a single magnet centered and fixed therein, the magnet being of bar form and positioned in a plane inclined 30° from horizontal, the body floating in the liquid and having a position therein spaced above the ball, and the magnet within the body having a condition exerting a magnetic pull on the ball to an extent short of drawing the ball into abutment with the body, in which condition the body the magnet and the ball are coaxial with one another and in which condition the magnet together with the body as a unit is adapted to turn about its axis relative to the ball to a predetermined position with respect to the earth's north magnetic pole.

2. A magnetic compass comprising a container of non-magnetic material having a concave inner bottom surface, a liquid partially filling the container, a float in the liquid having a magnet centered and fixed within its body, a soft iron ball in the liquid rollable over the concave surface below and in spaced relation to the float, the ball being subject to the pull of the magnet but adapted to resist being drawn into holding contact with the float because of its weight, the ball float and magnet having a common coaxial relation to one another, and the magnet together with the float as a unit being subject to turning about the common axis relative to the ball to position its north seeking pole in the direction of the earth's north magnetic pole (.), wherein the soft iron ball has an outer covering of non-magnetic material.

3. A magnetic compass as in claim 2, wherein a transparent cap covers over a top end of the container, and a compass readout card is disposed on the cap, the readout card having a central area through which a directional pointer on the float is visible.

4. A magnetic compass as in claim 3, wherein the container and the cap is of plastic material.

5. A magnetic compass as in claim 3, wherein the container is hemispherical.

6. A magnetic compass as in claim 3, wherein there is only one magnet centered and fixed within its body, the magnet is of bar form and dips at an angle of 30° from horizontal.

7. A magnetic compass comprising a container formed of non-magnetic material, the container being partially filled with liquid, a body having fixed thereto a single permanent magnet and floating in the liquid, an element of non-permanent magnetic material supported by the container in spaced relation to the body, the permanent magnet on the body having a condition exerting a magnetic pull on the element to an extent short of drawing the body into abutment with the element, in which condition the permanent magnet and the element are coaxial with one another and in which condition the permanent magnet together with the body as a unit is adapted to turn about its axis relative to the element to position its north seeking pole in the direction of the earth's north magnetic pole, the body having a directional pointer on its surface aligned with the north seeking pole of the permanent magnet, and the container having a transparent top surface through which the directional pointer is visible to an observer (.), wherein the permanent magnet is of bar form and dips at an angle of substantially 30° from horizontal.

* * * * *